(12) United States Patent
Harrington et al.

(10) Patent No.: US 7,494,091 B2
(45) Date of Patent: Feb. 24, 2009

(54) AIRCRAFT CART TRANSPORT AND STOWAGE SYSTEM

(75) Inventors: Anthony A. Harrington, Granite Falls, WA (US); Gary L. Bazzell, Everett, WA (US)

(73) Assignee: The Boeing Company, Chicago, IL (US)

( * ) Notice: Subject to any disclaimer, the term of this patent is extended or adjusted under 35 U.S.C. 154(b) by 368 days.

(21) Appl. No.: 10/906,465

(22) Filed: Feb. 22, 2005

(65) Prior Publication Data
US 2006/0186268 A1 Aug. 24, 2006

(51) Int. Cl.
*B64D 11/00* (2006.01)
*B66C 17/00* (2006.01)

(52) U.S. Cl. .................. 244/118.5; 212/312
(58) Field of Classification Search .......... 244/118.1, 244/118.5, 137.1; 414/280, 679; 198/832, 198/832.1, 833, 347.2
See application file for complete search history.

(56) References Cited

U.S. PATENT DOCUMENTS

| | | | | |
|---|---|---|---|---|
| RE20,554 E | * | 11/1937 | Ringe | 212/291 |
| 3,356,236 A | * | 12/1967 | Shaw et al. | 414/398 |
| 3,412,876 A | * | 11/1968 | Caiabrese | 414/141.5 |
| 3,661,415 A | * | 5/1972 | Piasecki | 294/67.1 |
| 3,741,504 A | * | 6/1973 | Alberti et al. | 244/137.1 |
| 4,022,404 A | | 5/1977 | Greiss | |
| 4,066,227 A | | 1/1978 | Buchsel | |
| 4,653,707 A | * | 3/1987 | Hamilton et al. | 244/137.2 |
| 4,901,840 A | * | 2/1990 | Babel | 198/346.1 |
| 5,074,496 A | * | 12/1991 | Rezag et al. | 244/118.1 |
| 5,158,188 A | * | 10/1992 | Nordberg | 212/312 |
| 5,322,244 A | | 6/1994 | Sprenger | |
| 5,337,908 A | * | 8/1994 | Beck, Jr. | 212/312 |
| 5,413,292 A | * | 5/1995 | Luria | 244/118.1 |
| 5,529,452 A | * | 6/1996 | Boyles et al. | 414/460 |
| 5,759,005 A | * | 6/1998 | Roessner et al. | 414/280 |

(Continued)

FOREIGN PATENT DOCUMENTS

EP 0 901 964 A 3/1999

(Continued)

*Primary Examiner*—Michael R Mansen
*Assistant Examiner*—Joseph W Sanderson
(74) *Attorney, Agent, or Firm*—Ostrager Chong Flaherty & Broitman P.C.

(57) ABSTRACT

An object transport and stowage system for an aircraft (10) includes a transport unit (32) for the transport of an object (20) within the aircraft (10). A first transfer drive system (62) is attached to the transport unit (32) and includes object engagement devices (92) that are engagable with the object (20). A motor (120) is mechanically coupled to and rotates one or more of the object engagement devices (92). A controller (66) is electrically coupled to the motor (120) and translates the object (20) relative to the transport unit (32). Another object transport and stowage system for an aircraft (10) includes a housing (150) for the stowage of an object (20) on the aircraft (10). A transfer drive system (64') is attached to the housing (150) and includes object engagement devices (168, 176), which are engagable with the object (20). A motor (162) is mechanically coupled to and rotates one or more of the object engagement devices (168, 176). A controller (68) is electrically coupled to the motor (162) and translates the object (20) relative to the housing (150).

18 Claims, 10 Drawing Sheets

U.S. PATENT DOCUMENTS

| | | | |
|---|---|---|---|
| 5,992,797 A | 11/1999 | Sankrithi | |
| 6,059,229 A * | 5/2000 | Luria | 244/118.1 |
| 6,305,643 B1 | 10/2001 | Sankrithi | |
| 6,340,136 B1 | 1/2002 | Luria | |
| 6,412,603 B1 * | 7/2002 | Nervig et al. | 187/267 |
| 6,454,208 B1 | 9/2002 | Nervig et al. | |
| 6,464,169 B1 | 10/2002 | Johnson et al. | |
| 6,477,962 B2 * | 11/2002 | Trujillo | 104/140 |
| 6,547,183 B2 * | 4/2003 | Farnsworth | 244/118.1 |
| 6,616,098 B2 | 9/2003 | Mills | |
| 6,619,902 B1 * | 9/2003 | Castaldi et al. | 414/280 |
| 6,663,043 B1 * | 12/2003 | Luria | 244/118.1 |
| 6,776,263 B2 * | 8/2004 | Gottlieb et al. | 187/251 |
| 6,808,142 B2 * | 10/2004 | Oki | 244/118.1 |
| 6,928,236 B2 * | 8/2005 | Suzuki et al. | 392/444 |
| 6,971,608 B2 * | 12/2005 | Harrington et al. | 244/118.5 |
| 6,997,665 B2 * | 2/2006 | Bouche et al. | 414/280 |
| 7,080,806 B2 * | 7/2006 | Mills | 244/118.1 |
| 7,137,593 B2 * | 11/2006 | Baatz | 244/118.5 |
| 7,159,821 B2 * | 1/2007 | Harrington et al. | 244/118.5 |
| 2002/0108529 A1 * | 8/2002 | Trujillo | 104/165 |
| 2002/0148928 A1 * | 10/2002 | Oki | 244/118.1 |
| 2003/0029967 A1 | 2/2003 | Mills | |
| 2005/0133308 A1 * | 6/2005 | Reysa et al. | 186/40 |
| 2005/0211832 A1 * | 9/2005 | Baatz | 244/118.1 |
| 2005/0224658 A1 * | 10/2005 | Nordstrom | 244/137.1 |

FOREIGN PATENT DOCUMENTS

| | | |
|---|---|---|
| EP | 1 279 592 | 1/2003 |
| WO | WO 03097454 A1 * | 11/2003 |

* cited by examiner

AIRCRAFT CART TRANSPORT AND STOWAGE SYSTEM

RELATED PATENTS

The present application is related to U.S. Pat. No. 6,971,608 issued on Dec. 6, 2005 and U.S. Pat. No. 7,159,821 issued on Jan. 9, 2007, the latter being a continuation-in-part of U.S. application Ser. No. 10/708,955 filed on Apr. 2, 2004, now U.S. Pat. No. 6,971,608.

TECHNICAL FIELD

The present invention is related generally to service carts, galleys, passenger cabins, and stowage areas of an aircraft. More particularly, the present invention is related to the transporting and stowage of service carts within an aircraft and to the efficient utilization of the stated areas.

BACKGROUND OF THE INVENTION

Modern aircraft typically include passenger compartments, galley service areas, overhead areas, and various stowage areas, which may be located on one or more decks. The galley areas often include and have associated therewith multiple service carts. The service carts contain various service related items, such as beverages and food items. The service carts may be stored in single rows under galley service counters on a main deck, in an overhead space, or on a lower deck. The stated areas and the service carts tend to occupy significant portions of an aircraft.

It is desirable within the aircraft industry to produce aircraft and aircraft systems that maximize the use of the space available within an aircraft. The maximization of space enhances customer value and revenue generating characteristics of an aircraft. As an example, a commercial aircraft can have an automated elevator system for the vertical transporting of galley carts between a main deck galley and an overhead galley cart stowage area or a lower lobe of the aircraft. As a result, the galley carts may be stored in the overhead stowage or lower lobe, which provides an increased amount of available space on the main deck for the passenger cabin. Increased available passenger cabin space allows for an increase in the number of passenger seats, which allows for an increase in the revenue-generating volume of an aircraft. Increased available passenger cabin space also allows for an increase in the size of the passenger seats, passenger legroom, carry-on stowage, the size of open areas and aisleways for passenger and crewmember movement, and the size or space allotted for passenger compartment related facilities, which increases customer satisfaction.

Spaces within the overhead stowage and lower lobe areas can be confined and thus movement and manipulation of service carts within these areas can be difficult. Currently service carts are manually transported and can weigh as much as approximately 250 lbs. In tight spaces, service carts of such weight are difficult to manipulate. Also, service carts typically have casters on which they are transported. Since the casters are able to swivel, when the service carts are inserted into a stowage space the casters can bind due to misalignment thereof. This binding can further increase the difficulty in manipulation of the service carts.

Thus, there exists a need for a service cart transport and stowage system that allows for efficient utilization of aircraft interior space and improves service cart transport ergonomics.

SUMMARY OF THE INVENTION

One embodiment of the present invention provides an object transport and stowage system for an aircraft. The system includes a transport unit for the transport of an object within the aircraft. A first transfer drive system is attached to the transport unit and includes object engagement elements that are engagable with the object. A motor is mechanically coupled to and rotates one or more of the object engagement elements. A controller is electrically coupled to the motor and translates the object relative to the transport unit.

Another embodiment of the present invention includes an object transport and stowage system for an aircraft that includes a housing for the stowage of an object on the aircraft. A transfer drive system is attached to the housing and includes object engagement elements, which are engagable with the object. A motor is mechanically coupled to and rotates one or more of the object engagement elements. A controller is electrically coupled to the motor and translates the object relative to the housing.

The embodiments of the present invention provide several advantages. One such advantage is the provision of an automated service cart transport system that is ergonomically pleasing. This provision minimizes manual service cart manipulation and thus allows for easy movement, translation, stowage, and removal therefrom of service carts within an aircraft.

Another advantage provided by an embodiment of the present invention, is the provision of a service cart transport system that eliminates the disadvantages associated with the inserting of a service cart within a stowage or transport unit.

Yet another advantage provided by an embodiment of the present invention, is the provision of a service cart transport system that allows for the automated loading and unloading of a service cart to and from an elevator or the like.

Still another advantage provided by an embodiment of the present invention, is the provision of a service cart transport system that shields an operator from a vertical shaft, thereby, preventing operator injury.

Additionally, another advantage provided by an embodiment of the present invention, is the provision of a service cart transport system that is easy to spatially integrate within an aircraft.

As well, another advantage provided by an embodiment of the present invention, is the ability to efficiently and safely transfer, suspend, lift, and lower heavy objects between and across decks of an aircraft without the objects tipping and falling.

Furthermore, the above stated advantages provide increased utility and space efficiency of crew cabin, galley, passenger, and stowage areas of an aircraft. The stated advantages increase the available space on a main deck, preserve the stowage of an overhead galley or stowage area, and preserve the payload capacity of a lower lobe or cargo bay of an aircraft.

The present invention itself, together with further objects and attendant advantages, will be best understood by reference to the following detailed description, taken in conjunction with the accompanying drawing.

Other features, benefits and advantages of the present invention will become apparent from the following description of the invention, when viewed in accordance with the attached drawings and appended claims.

DETAILED DESCRIPTION

In the following Figures the same reference numerals will be used to refer to the same components. While the present invention is described primarily with respect to an integrated transport and stowage system for the transporting of service carts within an aircraft, the present invention may be adapted and applied in various applications. The present invention may be applied in aeronautical applications, nautical applications, railway applications, automotive vehicle applications, and commercial and residential applications. The present invention may also be applied to various areas of an aircraft including galleys, overhead areas, main deck areas, lower lobe areas, passenger cabin areas, crewmember and non-crewmember areas, as well as other areas of an aircraft. Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Also, in the following description the term "object" may refer to a baggage item, a service cart, a stowage container, passenger or crewmember gear, or other objects that may be on or within an aircraft. An object may refer to any item, which may be lifted via the vertical lift device described below and/or stowed within a stowage unit.

Figures 1, 1A:
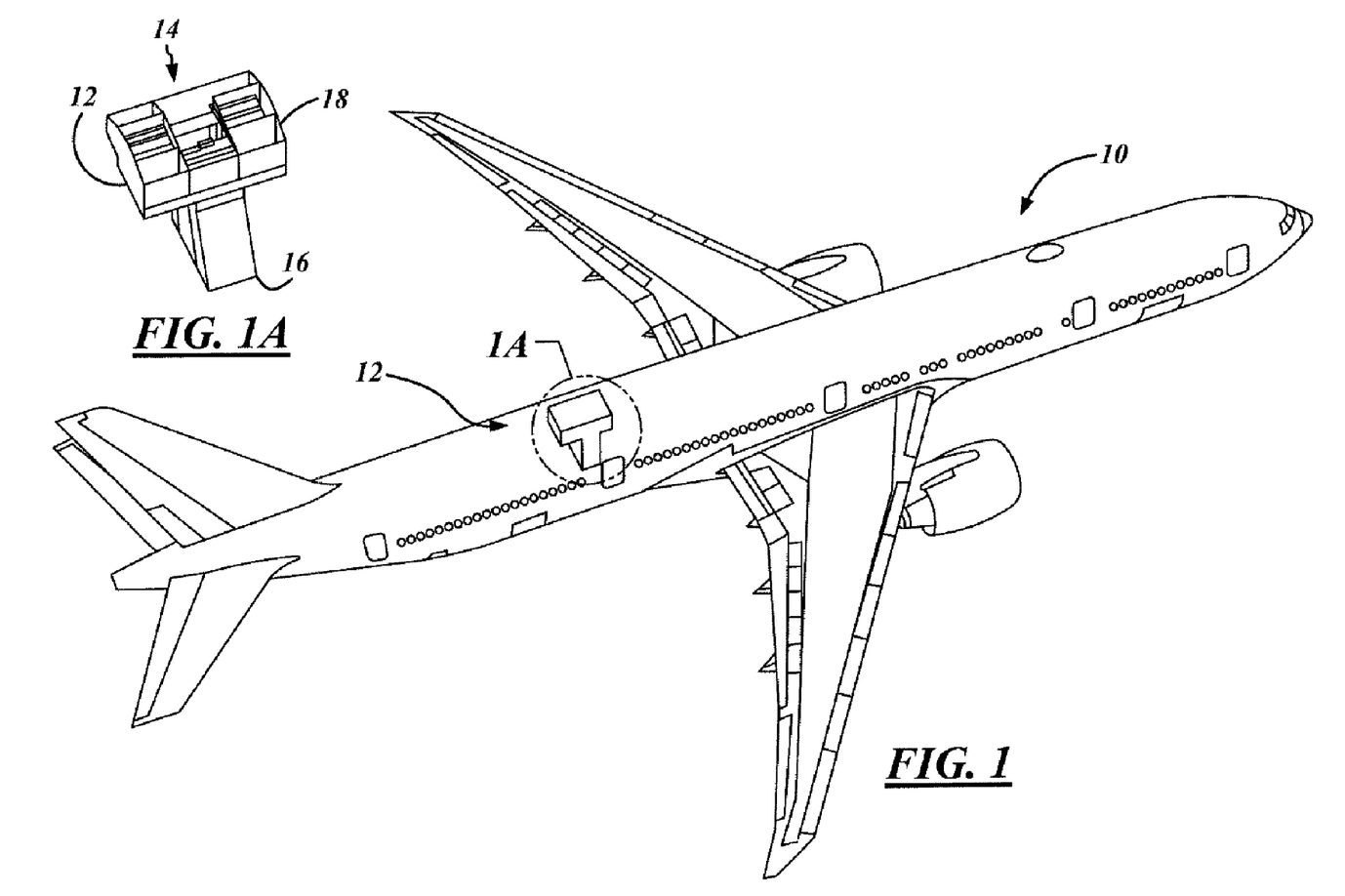
FIG. 1 is a perspective view of an aircraft having a bi-level module with an integrated transport and stowage system in accordance with an embodiment of the present invention.
FIG. 1A is a perspective view of the bi-level module of FIG. 1.

Referring now to FIGS. 1 and 1A, an aircraft 10 having a bi-level galley module 12 with an integrated transport and stowage system 14 in accordance with an embodiment of the present invention is shown. With attention to FIG. 2, the bi-level galley module 12 includes a main-deck sub-module 16 and an overhead sub-module 18 that is disposed above the main-deck sub-module 16. However, it will be appreciated that the airframe of the aircraft 10 can instead define a bi-level galley module 12 in various other suitable constructions besides a modular one.

Figure 2:
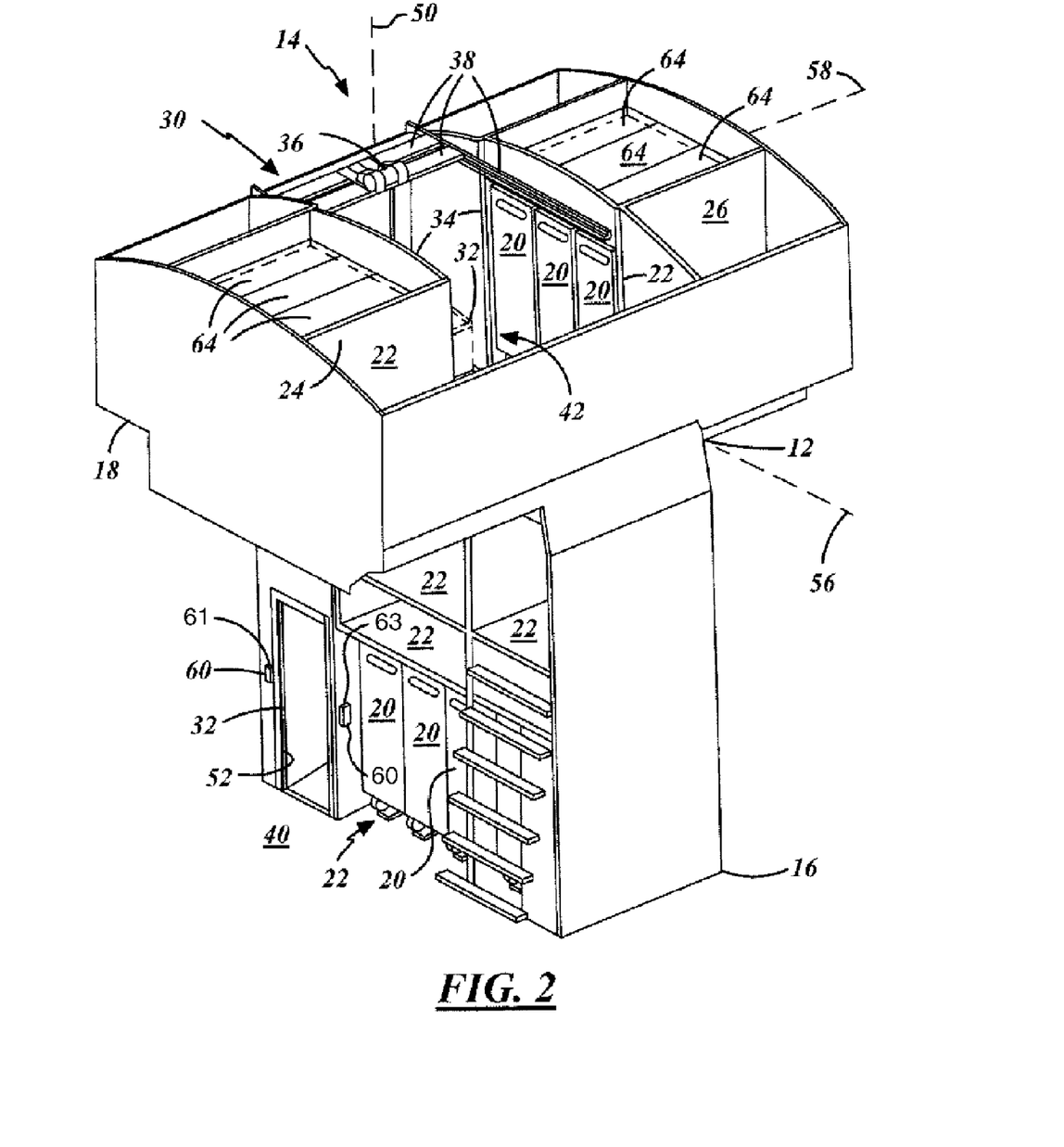
FIG. 2 is a perspective view of the bi-level galley module of FIG. 1.

The bi-level galley module 12 is utilized for storing a series of objects, such as service carts 20 in the main-deck sub-module 16 and/or the overhead sub-module 18. The overhead module 18 includes multiple galley storage units 22. The overhead module 18 allows for the storage and alignment of the service carts 20 in lateral rows in both the forward section 24 and in the rearward section 26. In this way, the bi-level galley module 12 can store about twice as many service carts as a single-level galley module having a similarly sized perimeter. This feature is beneficial because it can decrease the overall number of galleys in an aircraft and increase the amount of available space on a main deck. One skilled in the art will understand that this additional space can be utilized for hosting additional passenger seats, maintaining the same number of passenger seats while increasing their size, increasing the room for the passengers and the crewmembers to move about the aircraft 10, and provide various other advantages, or any combination thereof. In addition, it will be appreciated that this bi-level galley module 12 does not occupy any space in the lower lobe or cargo bay of the aircraft 10. In this regard, the bi-level galley module 12 is further beneficial for preserving the payload capacity of the aircraft 10.

The service carts 20 may contain beverage and food items, waste carts, storage containers, and various other service related items, such as ovens, coffee pots, and beverage racks. The service carts 20 may also include passenger compartment supplies, cleaning supplies, baggages, and other aircraft related items. The service cart 20 may have handles or openings 28 for crewmembers to manipulate and align the service carts 20.

The integrated transport and stowage system 14 includes an elevator or vertical lift device 30, a transport unit 32, and one or more stowage units 34. The vertical lift device 30 is shown in the form of a gantry having a lift motor 36 and rails 38. This vertical lift device 30 is a motorized pulley mechanism. However, it is contemplated that the lift device 30 can instead be a screw mechanism, a belt mechanism, a manually operated mechanism or otherwise, or any combination thereof as desired. The vertical lift device 30 is used to raise and lower the transport unit 32 between a main deck 40 and an overhead galley area 42. The transport unit 32 is utilized to carry the service carts 20 or other objects to and from the stowage units 34. The stowage units 34 may be of various sizes and shapes and hold any number of service carts. The service carts 20 may also be of various sizes and include full and half depth service carts, as are known and utilized in the art.

Figure 3A:
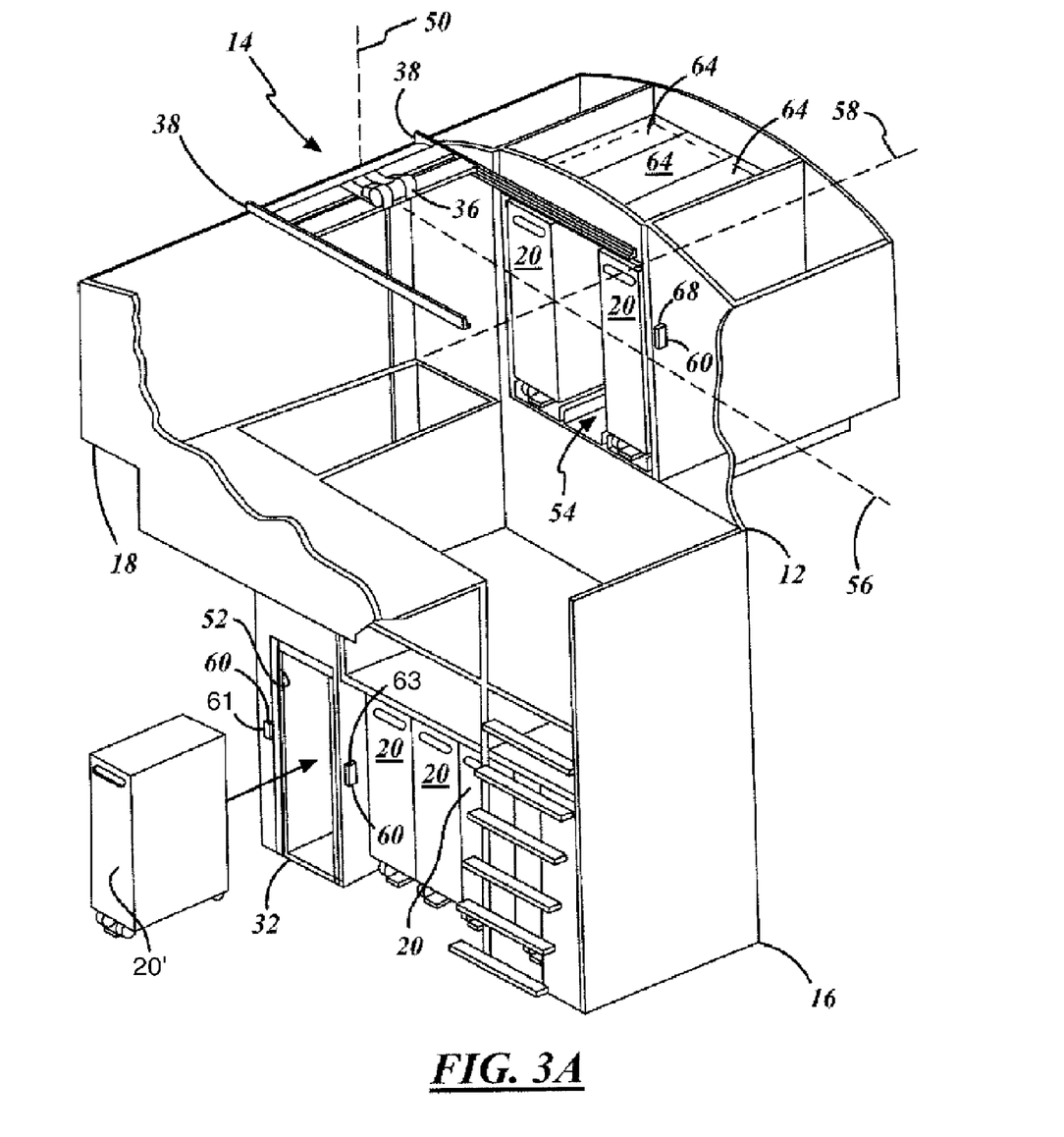
FIGS. 3A-D are partial cutaway perspective views of the bi-level galley module of FIG. 1, sequentially illustrating the integrated transport and stowage system moving a service cart from a main-deck to an overhead stowage unit in accordance with an embodiment of the present invention.
Figure 3B:
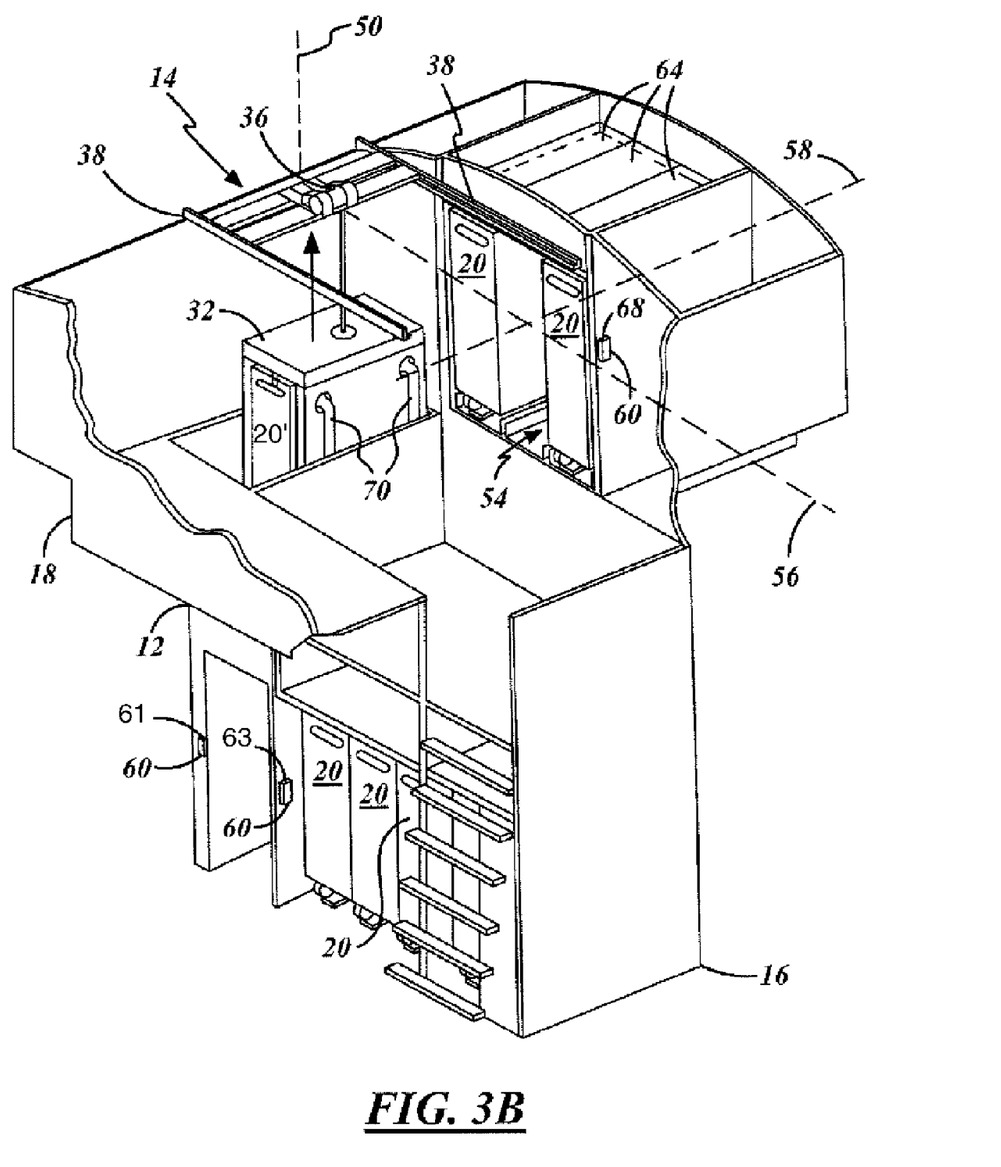
Figure 3C:
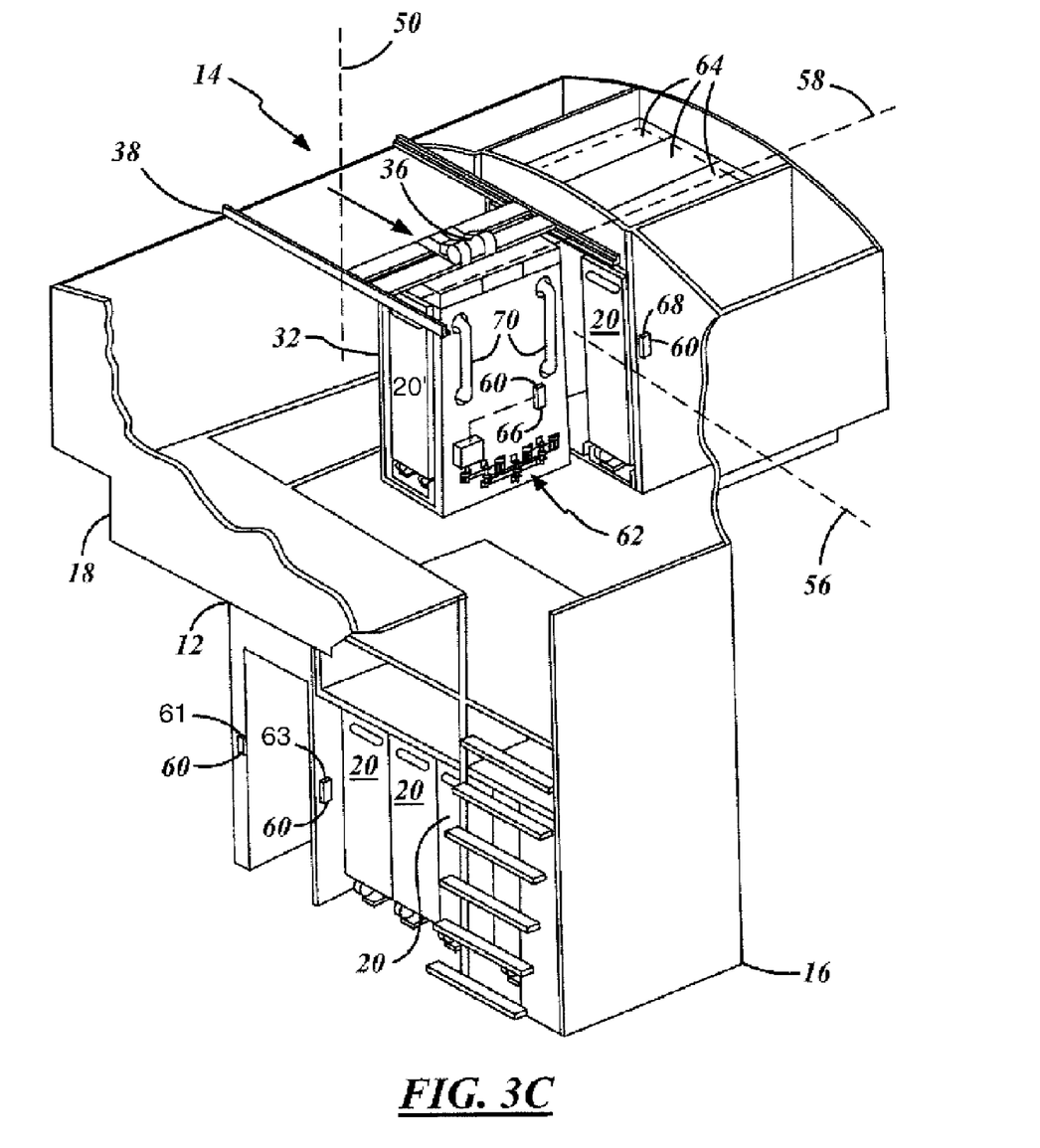
Figure 3D:
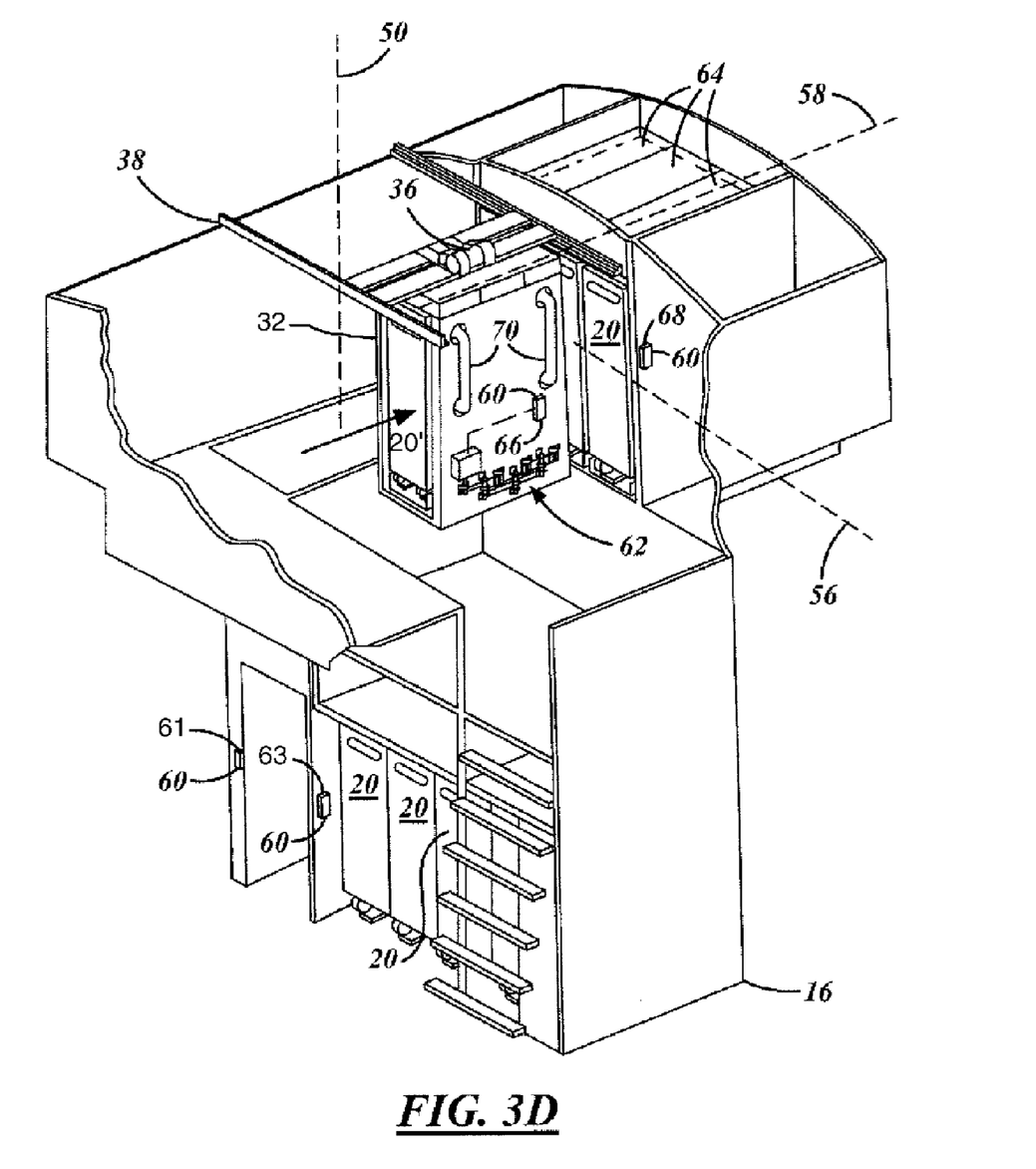

Referring now to FIGS. 3A-3D, a sample sequential operation of the integrated transport system 14 for the stowing of the service carts 20 in the overhead sub-module 18 is shown in accordance with an embodiment of the present invention. Specifically, FIG. 3A illustrates the insertion of a service cart 20' into the transport unit 32. FIG. 3B illustrates the raising of the transport unit 32, containing the service cart 20', to the overhead sub-module 18 along a longitudinal axis 50 of a shaft 52. The shaft 52 extends between the main-deck sub-module 16 and the overhead sub-module 18. FIG. 3C illustrates lateral translation of the transport unit 32 on the rails 38 from the shaft 52 over to a designated stowage area or slot 54 of the stowage units 34. The transport unit 32 is translated along a lateral axis 56 of the overhead sub-module 18. Finally, FIG. 3D illustrates the removal of the service cart 20' from the transport unit 32 and the insertion of the service cart 20' into the stowage unit 34. The service cart 20' when transported from the transport unit 32 to the stowage unit 34 is moved along a fore/aft axis 58.

The integrated transport system 14 includes one or more controllers 60, which activate and operate the vertical lift device 30, a transport unit transfer drive system 62, and one or more stowage unit transfer drive systems. The stowage unit transfer drive systems are represented by boxes 64 in FIGS. 2-3D. The controllers 60 may be as simple as or include switches located in one or more locations on the main-deck sub-module 16 and the overhead sub-module 18, as well as on the transport unit 32. When switches are utilized, the switches may be in the form of rocker switches, toggle switches, push button switches, rotary switches, or other switches known in the art.

The controllers 60 may be microprocessor based such as a computer having a central processing unit, memory (RAM and/or ROM), and associated input and output buses. The main controllers 60 may be application-specific integrated circuits or may be formed of other logic devices known in the art. The controllers 60 may be a portion of a central main control unit, a control circuit having a power supply, combined into a single integrated controller, or may be stand-alone controllers as shown.

In the embodiment shown a first controller 61 is coupled to the shaft 52 and is located on the main deck 40. The first controller 61 is used to operate the vertical lift device 30. A second controller 63 is also coupled to the shaft 52 and is used to operate the transfer drive system 62 when the transport unit is located on the main deck 40. A third controller 66 is coupled to a side of the transport unit 32 and is used to operate the transfer drive system 62 when the transport unit is located in the overhead stowage area 42. A fourth controller 68 is coupled to the storage unit 34 and is used to operate the transfer drive systems 64.

The transport unit 32 may be laterally or longitudinally displaced along the rails 38 via a fifth controller (not shown) or manually via one or more handles 70 located on the transport unit. The handles 70 provide ease in the manipulation of the transport unit 32. The vertical lift device 30 may have sensors (not shown) for detection of the slots of the service carts 20. Although a specific number of controllers are shown, any number of controllers may be utilized. The integrated transport system 14 may be fully or partially automated. In one envisioned embodiment, a crewmember selects a slot or a particular service cart via a controller located on the main deck 40 and the integrated transport system 14 either raises a service cart into the overhead stowage area 42 and inserts that cart into the appropriate slot or removes the service cart from the selected slot and lowers the service cart down to the main deck 40. The vertical lift device 30 may align itself with that appropriate slot, via position sensors (not shown).

Figure 4A:
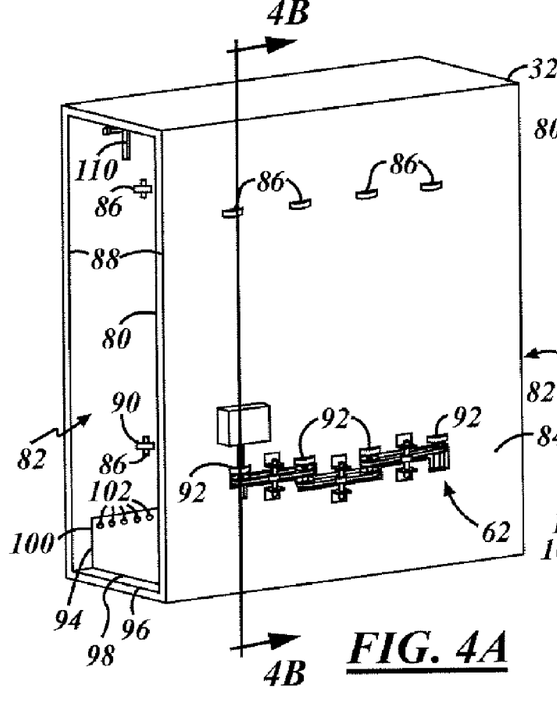
FIG. 4A is a perspective view of a transport unit having a transport drive system in accordance with an embodiment of the present invention.
Figure 4B:
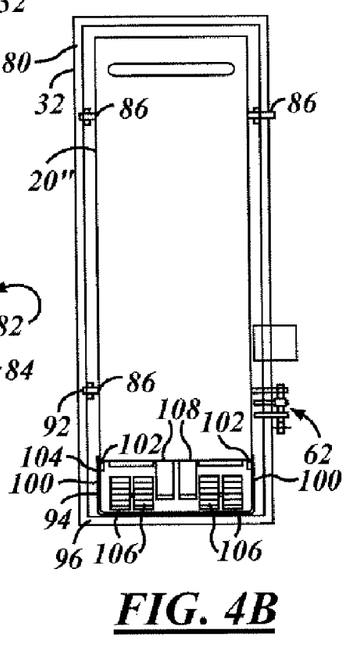
FIG. 4B is a front cross-sectional view of the transport unit of FIG. 4A.
Figure 4C:
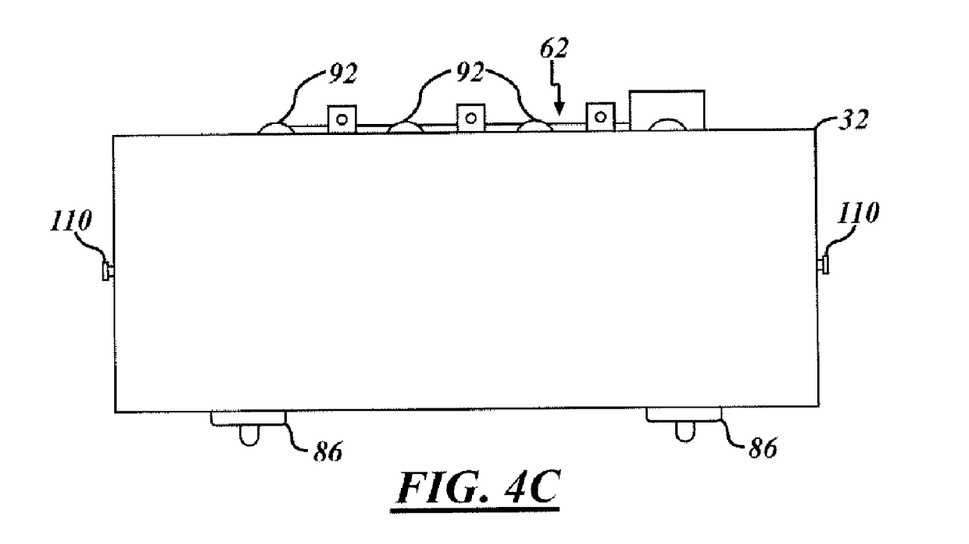
FIG. 4C is a top view of the transport unit of FIG. 4A.

Referring now to FIG. 4A-C, perspective, front cross-sectional, and top views of the transport unit 32 in accordance with an embodiment of the present invention is shown. The transport unit 32 includes a cage 80 and the transfer drive system 62. The cage 80 may be formed of various rigid materials, including metallic and non-metallic materials. The cage 80 has a pair of opposing openings 82 for the insertion and removal of a service cart 20". The transfer drive system 62 is attached to and is an integral part of a side 84 of the cage 80. The transfer drive system 62 engages with and draws the service cart 20" into or drives the service cart 20" out of the cage 80. The transfer drive system 62 is described in more detail below with respect to the embodiment of FIG. 6.

The transport unit 32 also includes idler wheels 86 that are mechanically coupled to the sides 88 of the cage 80 and are used to guide the service cart 20" in and out of the cage 80. The idler wheels 90 that are opposite the transfer drive system 62 may be spring-loaded and/or include spring-loaded arms (not shown), which are used to apply pressure on the service cart 20" to maintain adequate contact between the service cart 20" and the transfer drive system 62. This applied pressure aids in maintaining traction between the service cart 20" and object engagement elements 92 of the transfer drive system 62. The idler wheels 86 may be formed of various materials, such as polyurethane, rubber, and other suitable materials known in the art. One skilled in the art would envision various configurations of the idler wheels.

The transport unit 32 further includes a roller tray 94. The roller tray 94 resides and is attached to the bottom 96 of the cage 80. The roller tray 94 has a U-shaped bracket 98 with vertical members 100. Rollers 102 are coupled to and arranged in series along an upper portion 104 of the tray 94. The rollers 102 support the service cart 20" within the cage 80, such that the wheels or casters 106 of the service cart 20" are suspended. In suspending the casters 106, the service cart 20" may be translated without binding of the casters 106 and/or movement impediment from the service cart braking system 108. The roller tray 94 also aids in guiding the service cart 20" in and out of the cage 80.

The transport unit 32 includes one or more restraint members 110 for securing the service cart 20" to the cage 80 and preventing the service cart 20" from tipping over or otherwise falling from the cage 80. The restraint members 110 may include quarter turn locks, as shown, or other restraint members known in the art. The restraint members 110 and the sides 88 hold the service cart 20" in position and prevent movement thereof. This feature is advantageous because it can substantially improve the safety of storing, retrieving, or otherwise transporting service carts, which can weigh up to approximately 250 pounds.

Figure 5:
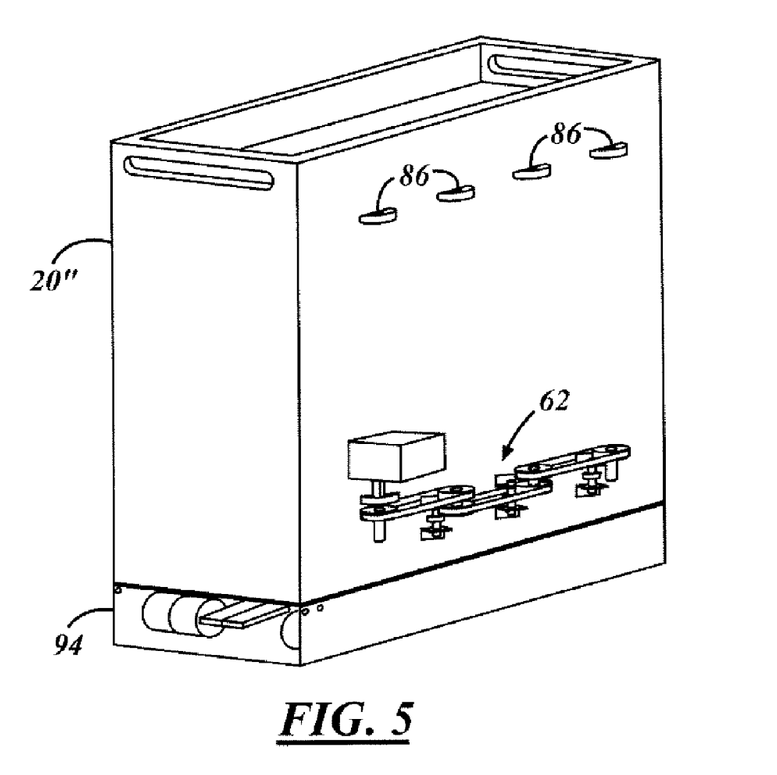
FIG. 5 is a perspective view illustrating the relationship between the transfer drive system of FIG. 4A and a service cart in accordance with an embodiment of the present invention.

Referring now to FIG. 5, a perspective view illustrating the relationship between the transfer drive system 62 and the service cart 20" in accordance with an embodiment of the present invention is shown. The associated cage 80, which holds the transfer drive system 62, is not shown. The service cart 20" is shown as residing on the roller tray 94. Although the relative position of the transfer drive system 62 and idler wheels 86 relative to the service cart 20" are shown, other arrangements may be utilized.

Figure 6:
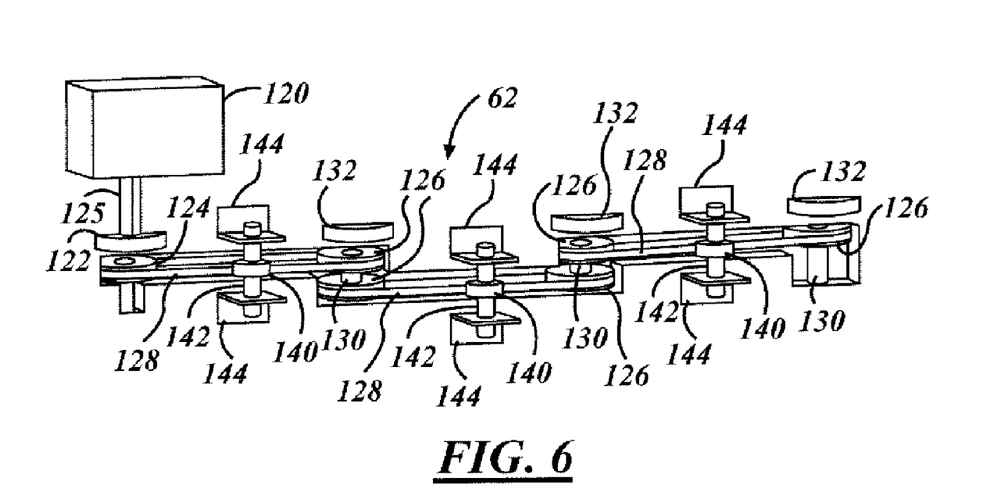
FIG. 6 is a perspective view of the transfer drive system of FIG. 4A.

Referring now to FIG. 6, a perspective view of the transfer drive system 62 in accordance with an embodiment of the present invention is shown. The transfer drive system 62 includes a drive motor 120, which is coupled to a first or primary drive wheel 122 and a primary energy transfer pulley 124 via a single drive engagement point or drive shaft 125. The drive motor 120 may be an AC or DC motor and be controlled via one or more of the controllers 60. The energy transfer pulley 124 is coupled to the secondary energy transfer pulleys 126 via rotating bands 128. The rotating bands 128 ride on the secondary energy transfer pulleys 126, which rotate on axels 130, and in turn rotate the secondary drive wheels 132. The axels 130 are coupled within a side of the transport unit 32, such as the side 84.

The primary and secondary drive wheels 122 and 132 may be formed of polyurethane or rubber and are engageable with the service cart 20''' or other transported object. In one embodiment of the present invention, the primary and secondary drive wheels 122 and 132 are in the form of a polycrush wheel, which is deformable and relatively soft such that they generally grab and provide a high level of friction between the wheels 122 and 132 and the service cart 20'''. This high level of friction aids in the translation of the service cart 20'''. Also, the material characteristics of the wheels 122 and 132 prevent denting, deforming, or degrading of the service cart 20'''. The rotating bands 128 may be in the form of belts, chains, or other bands known in the art. Belt pretensioners 140 or the like may be utilized, as shown, to maintain the rotating bands 128 in a taught state, which prevents slipping of the bands 128. The belt pretensioners 140 may have associated axels 142 and brackets 144, which are attached to the side 84.

The drive wheels 122 and 132 are object engagement elements. Other object engagement elements known in the art may be utilized to engage with and translate an object or a service cart. Since one skilled in the art could envision other configurations of the transfer drive system 62, the object engagement elements may include wheels, belts, chains, sprockets, latches, traction devices, hooking devices, or other engagement devices.

Figure 7:
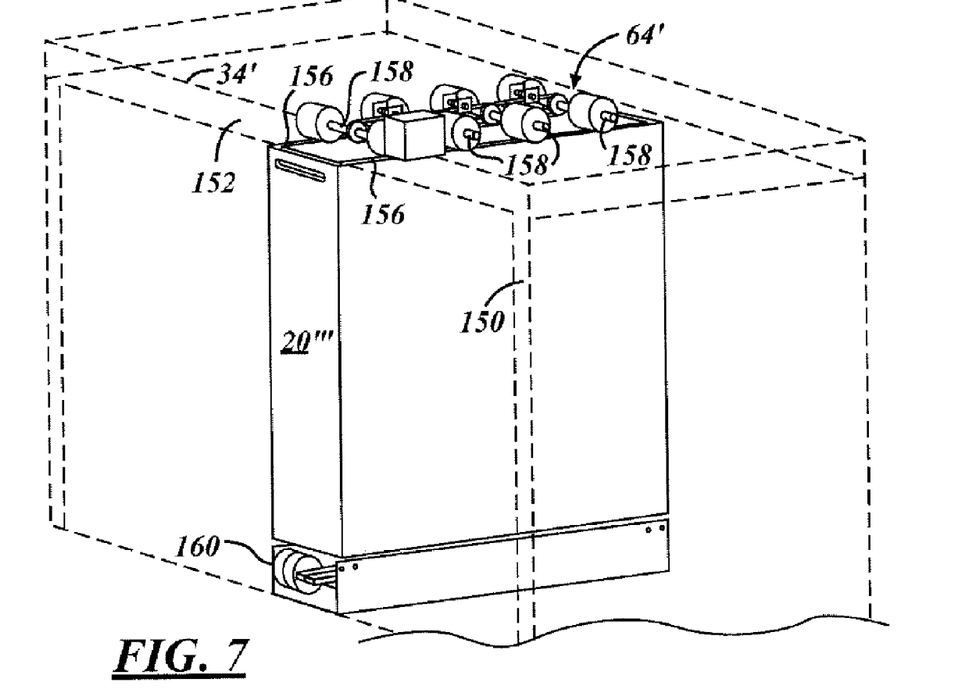
FIG. 7 is a perspective view of a stowage unit having a transfer drive system in accordance with an embodiment of the present invention.

Referring now to FIG. 7, a perspective view of a stowage unit 34' having a transfer drive system 64' in accordance with an embodiment of the present invention is shown. The stowage unit 34', similar to the transport unit 32, includes a housing 150 and one or more of the transfer drive system 64'. The transfer drive system 64' is used for the insertion and extraction of the service cart 20'''' to and from the stowage unit 34'. The transfer drive system 64' is coupled, however, to and/or within a top wall 152 of the stowage unit 34' and engages with a top side or top edges 156 of the service cart 20''''.

The transfer drive system 64' includes similar components to that of the transfer drive system 62. Wheel axels or rotating shafts 158 of the transfer drive system 64' may be incorporated into the top wall 152 or attached via brackets (not shown). The transfer drive system 64' is located on the top wall 152 to conserve space or available stowage unit width for the stowage of service carts. The stowage unit may include roller trays 160 (one of which is shown) that are similar to the roller tray 94. The roller trays 160 may be used to define slots in the stowage unit 34'.

Figure 8:
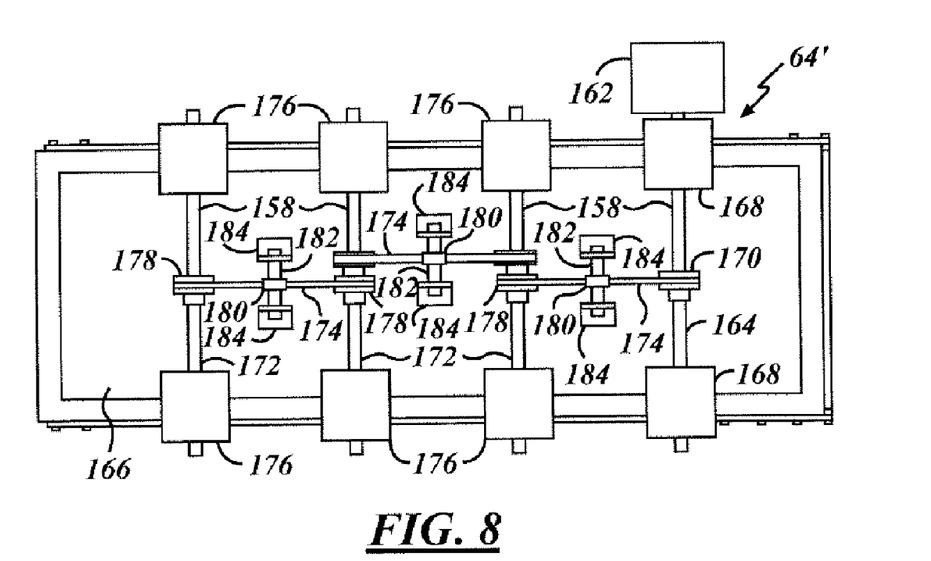
FIG. 8 is a top view of the transfer drive system of FIG. 7 and a service cart in accordance with an embodiment of the present invention.

Referring now to FIG. 8, a top view of the transfer drive system 64' and the service cart 20'''' are shown. The transfer drive system 64' includes a motor 162 that is coupled to a primary stowage unit shaft 164, which extends across the topside 166 of the service cart 20''''. The primary stowage unit shaft 164 is coupled to and rotates a pair of primary drive wheels 168 and a primary energy transfer pulley 170. The primary energy transfer pulley 170 is coupled to and rotates secondary stowage unit shafts 172 via rotating bands 174. The secondary shafts 172 are coupled to and rotate secondary drive wheels 176 and secondary energy transfer pulleys 178. The stowage unit shafts 164 and 172 are coupled in a series arrangement, although a parallel arrangement or other arrangement may be utilized. Pretensioners 180 may be used, as shown to apply pressure on and to maintain the rotating bands 174 in a taught state. The pretensioners 180 reside on the axels 182, which are coupled to the top wall 152 via the brackets 184. The wheels 168 and 176 are also object engagement devices and may also be replaced with other object engagement devices, as appropriate for a given configuration.

Although not shown, the transport unit 32 and the stowage units 34 and 34' may include contact and position detection sensors (not shown) for the monitoring of service carts therein. The sensors may be coupled to controllers, such as the controllers 60, and used to control the alignment, position, and translation of the service carts. The sensors may also be used to aid in the alignment of the service carts relative to the transport unit 32 and the stowage units 34 and 34'. The controllers in response to information received from the sensors may allow or prevent translation of the service carts.

Although the present invention is primarily herein described with respect to the moving of an object between a main deck galley area and an overhead stowage area, the present invention may be utilized to move objects between various other areas and decks of an aircraft.

Figure 9:
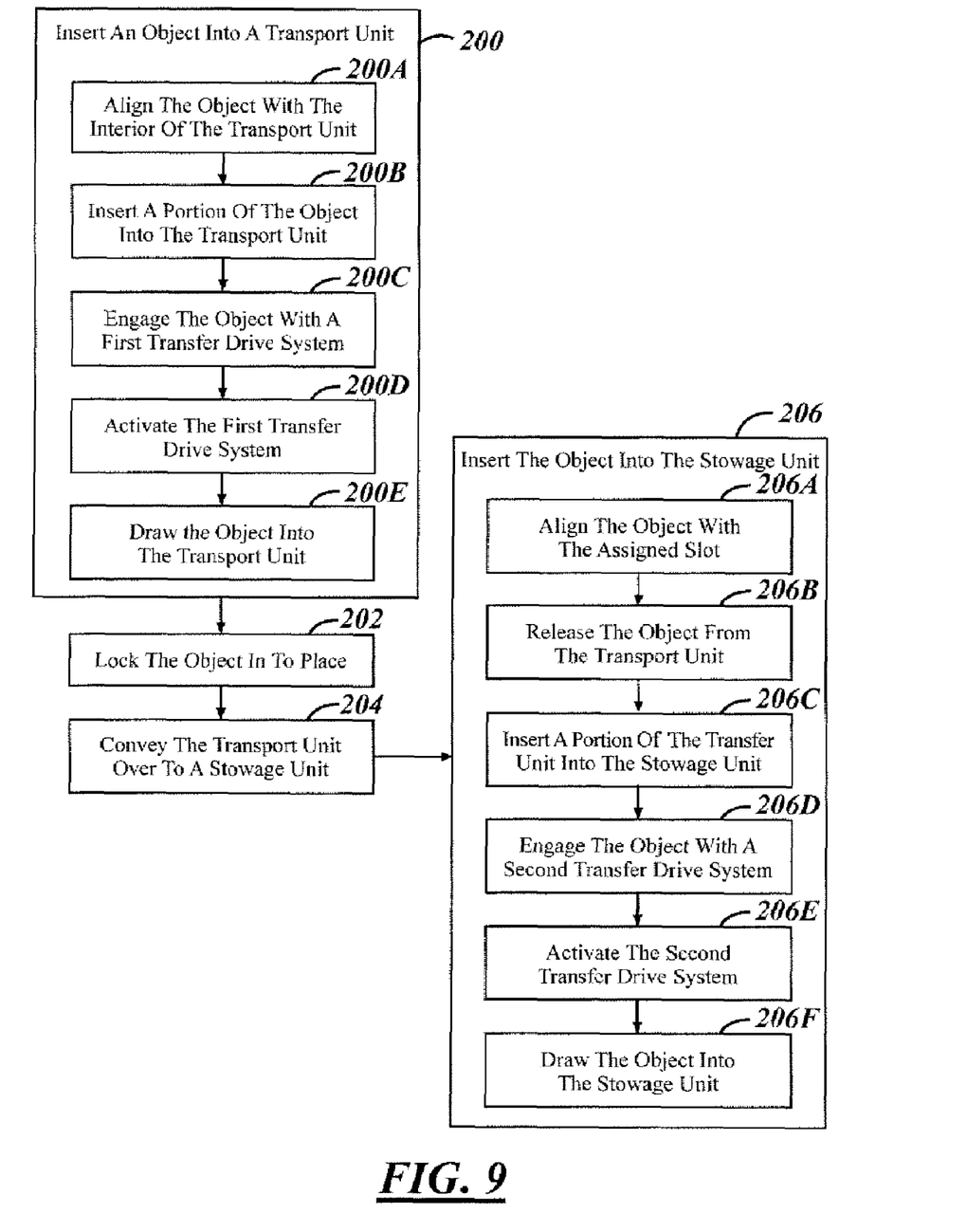
FIG. 9 is a logic flow diagram illustrating a method of transporting and stowing an object within an aircraft in accordance with an embodiment of the present invention.

Referring now to FIG. 9, a logic flow diagram illustrating a method of transporting and stowing an object within an aircraft in accordance with an embodiment of the present invention is shown. Although the below steps are primarily described with respect to the embodiments of FIGS. 4A-8, the steps may be easily modified to apply to other embodiments of the present invention. Also, the below steps may be performed in a reverse order when removing an object from a stowage unit.

In step 200, an object, such as a service cart, is inserted into a transport unit, such as the transport unit 32. In step 200A, the object is aligned with an interior or interior components of the transport unit 32. For example, a service cart may be aligned with the roller tray 94 and between the idler wheels 86 and the drive wheels 122 and 132 of the transfer drive system 62. In step 200B, a portion of the object is inserted into the transport unit. The service cart may be inserted within a cage of the transport unit such that the service cart engages with the transfer drive system contained therein. In step 200C, the object engages with a first transfer drive system that is attached to the transport unit.

In step 200D, the first transfer drive system is activated. A controller, such as one of the controllers 60, activates a first motor of the transfer drive system, which enables rotation of the drive wheels for translation of the object.

In step 200E, the object is drawn into the transport unit via the components of the transfer drive system. Upon insertion of the object fully within the transport unit step 202 is performed.

In step 202, the object is locked into place. Retention devices, such as the retention devices 110, are rotated, latched, hooked, or actuated such that the object is held in place within the transport unit. In step 204, the transport unit is conveyed over to a stowage unit, such as the stowage unit 34. The transport unit may be lifted via a vertical lift device and translated over to an interior designated portion of or an assigned slot of the stowage unit.

In step 206, the object is inserted into the stowage unit. In step 206A, the object is aligned with the assigned slot. In step 206B, the object is released from the transport unit. One or more of the retention devices are actuated to allow for removal of the object from the transport unit. In step 206C, a portion of the object is inserted into the stowage unit. This insertion may be performed manually or through use of the transfer drive system located on the transport unit. The transport unit is extracted partially from the transport unit and inserted into the stowage unit. In step 206D, the object engages with a second transfer drive system mounted within the stowage unit, such as the transfer drive system 64'. The first drive system is activated and is used to extract the object from the transport unit and into the slot. Upon engagement with the second transfer drive system the first transfer drive system is deactivated. Note that the transfer drive systems of the transport unit and of the stowage unit may be activated in response to information received from contact or position sensors, which indicate position of the object. In step 206E, the second transfer drive system is activated. In step 206F, the second transfer drive system draws the object into the stowage unit via components and devices associated therewith.

The above-described steps are meant to be illustrative examples; the steps may be performed sequentially, synchronously, simultaneously, or in a different order depending upon the application. Also, although the above steps describe the use of both the transfer drive system on a transport unit and a transfer drive system on a stowage unit, the transfer drive systems may be utilized separately, alone, or in combination.

The present invention provides a transport and stowage system that allows for efficient and easy stowage and removal therefrom of service carts and other aircraft related objects. The present invention, in so doing, efficiently utilizes space within a main deck of an aircraft, which provides increased available space for various main deck design layouts that may have otherwise not been feasible and/or considered.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An integrated object transport and stowage system for an aircraft having a bi-level module for moving at least one object from a main-deck to an overhead stowage area, comprising:
    a transport unit for the transport of said at least one object within the aircraft, the transport unit being moved in a horizontal and vertical direction;
    a vertical lift device for raising and lowering said transport unit between said main-deck and said overhead stowage area;
    at least one overhead stowage unit in said overhead storage area; and
    a first transfer drive system attached to said transport unit and comprising:
        a first plurality of object engagement devices engagable with said at least one object;
        a first motor mechanically coupled to and rotating at least one of said first plurality of object engagement devices; and
        a first controller electrically coupled to said first motor for activating said first motor which enables lateral translation of said at least one object relative to said transport unit for insertion and removal of said at least one object to and from the at least one overhead stowage unit.

2. A system as in claim 1 wherein said first controller's activation of said first motor results in translating said at least one object to perform at least one task selected from drawing said at least one object into said transport unit, releasing said at least one object, and translating said at least one object out of said transport unit.

3. A system as in claim 1 wherein said at least one object comprises a service cart.

4. A system as in claim 1 wherein said first transfer drive system is integrated as part of a wall of said transport unit.

5. A system as in claim 1 wherein said first motor rotates said first plurality of object engagement devices via a single drive engagement point.

6. A system as in claim 1 further comprising at least one rotational band mechanically coupling said first plurality of object engagement devices.

7. A system as in claim 1 wherein said first transfer drive system further comprises:
    a plurality of rotational bands coupled to said first plurality of object engagement devices; and
    a plurality of pulleys coupled to said plurality of rotational bands;
    said first motor rotating said first plurality of object engagement devices via said plurality of rotational bands and said plurality of pulleys.

8. A system as in claim 1 further comprising:
    at least one rotational band coupled to said first plurality of object engagement devices; and
    at least one tensioner coupled to said at least one rotational band and maintaining tension on said at least one rotational band.

9. A system as in claim 1 wherein said first plurality of object engagement devices comprise a self-crushing style wheel.

10. A system as in claim 1 further comprising at least one idler wheel for guidance of said at least one object in and out of said transport unit.

11. A system as in claim 1 wherein said transport unit comprises a tray for guidance and suspension of said at least one object within said transport unit.

12. A system as in claim 11 wherein said tray comprises a plurality of roller bearings for support of said at least one object.

13. A system as in claim 1 wherein said first controller comprises a switch.

14. A system as in claim 1 further comprising a stowage unit comprising a second transfer drive system for insertion and removal of said at least one object to and from the stowage unit.

15. A system as in claim 14 wherein said second transfer drive system comprises:
    a second plurality of object engagement devices engagable with said at least one object; and
    a second motor mechanically coupled to and rotating at least one of said second plurality of object engagement devices to translate said at least one object relative to said stowage unit.

16. A system as in claim 15 further comprising a second controller electrically coupled to said second motor and translating said at least one object relative to said stowage unit.

17. A system as in claim 1 further comprising a gantry translating said transport unit.

18. A system as in claim 1 wherein the vertical lift device comprises a lift elevator for raising and lowering said transport unit.

* * * * *